(12) United States Patent
Moore et al.

(10) Patent No.: US 7,162,799 B2
(45) Date of Patent: Jan. 16, 2007

(54) METHOD FOR MANUFACTURING AN ITEM

(75) Inventors: Diane E. Moore, Pleasant Ridge, MI (US); John J. Lubash, Northville, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 11/066,071

(22) Filed: Feb. 25, 2005

(65) Prior Publication Data

US 2005/0150094 A1 Jul. 14, 2005

Related U.S. Application Data

(63) Continuation of application No. 09/544,422, filed on Apr. 6, 2000, now abandoned.

(51) Int. Cl.
*B23B 11/00* (2006.01)

(52) U.S. Cl. ............... 29/897.2; 29/407.01; 29/407.04; 29/429; 29/430; 29/712; 29/720; 29/783; 29/791; 29/824; 340/572.1; 340/686.4; 340/686.5

(58) Field of Classification Search ............... 29/897.2, 29/407.01, 407.04, 430, 703, 709, 712, 714, 29/720, 721, 783, 429, 791, 824; 340/686.1, 340/686.4, 686.5, 686.6, 572.1
See application file for complete search history.

(56) References Cited

U.S. PATENT DOCUMENTS

| | | | |
|---|---|---|---|
| 3,076,257 A | | 2/1963 | Svenson |
| 4,069,764 A | | 1/1978 | Teyssedre |
| 4,332,012 A | * | 5/1982 | Sekine et al. ............... 700/116 |
| 4,646,245 A | * | 2/1987 | Prodel et al. ............... 700/113 |
| 4,683,651 A | * | 8/1987 | Taketani et al. .............. 29/786 |
| 4,715,772 A | | 12/1987 | Kanayama |
| 4,783,904 A | | 11/1988 | Kimura |
| 4,815,190 A | | 3/1989 | Haba, Jr. et al. |
| 4,884,330 A | * | 12/1989 | Sticht .......................... 29/430 |
| 4,928,383 A | | 5/1990 | Kaczmarek et al. |
| 4,937,743 A | | 6/1990 | Rassman et al. |
| 4,937,929 A | | 7/1990 | Nokajima et al. |
| 5,088,045 A | * | 2/1992 | Shimanaka et al. ......... 700/110 |
| 5,127,569 A | | 7/1992 | Sekine et al. |
| 5,161,929 A | | 11/1992 | Lichti, Sr. et al. |
| 5,207,309 A | | 5/1993 | Simpkin et al. |
| 5,241,482 A | | 8/1993 | Iida et al. |
| 5,255,197 A | * | 10/1993 | Iida ............................ 700/108 |
| 5,314,055 A | | 5/1994 | Gordon |
| 5,467,268 A | | 11/1995 | Sisley et al. |

(Continued)

FOREIGN PATENT DOCUMENTS

DE 33 21 075 A1 12/1984

(Continued)

OTHER PUBLICATIONS

"Zoom Status From Graphics Development System," IBM Technical Disclosure Bulletin, Jan. 1990. 3 pgs.

(Continued)

*Primary Examiner*—Jermie E. Cozart
(74) *Attorney, Agent, or Firm*—Raymond L. Coppielle; Brooks Kushman P.C.

(57) ABSTRACT

A method for notifying installers 14–22 of the existence, type, and location of a portion 26 of an item within an assembly line 10. The notification allows the installers 14–22 to respectively ensure that the components 40 which are needed to be placed upon the portion 26 are available for use by the installer 14–22 in a timely manner.

13 Claims, 1 Drawing Sheet

U.S. PATENT DOCUMENTS

| | | |
|---|---|---|
| 5,485,590 A | 1/1996 | Hyatt et al. |
| 5,495,430 A | 2/1996 | Matsunari et al. |
| 5,758,329 A | 5/1998 | Wojcik et al. |
| 5,850,187 A | 12/1998 | Carrender et al. |
| 5,887,176 A | 3/1999 | Griffith et al. |
| 5,893,208 A | 4/1999 | Sasaki et al. |
| 5,920,261 A | 7/1999 | Hughes et al. |
| 5,920,287 A | 7/1999 | Belcher et al. |
| 5,980,084 A | 11/1999 | Jones et al. |
| 6,075,707 A | 6/2000 | Ferguson et al. |
| 6,150,921 A | 11/2000 | Werb et al. |
| 6,226,848 B1 | 5/2001 | Kurtz |
| 6,256,868 B1 | 7/2001 | Sugito et al. |
| 6,259,056 B1 | 7/2001 | Cowden |
| 6,317,082 B1 | 11/2001 | Bacon et al. |
| 6,324,749 B1 | 12/2001 | Katsuura et al. |
| 6,360,421 B1 | 3/2002 | Oatridge et al. |
| 6,404,339 B1 | 6/2002 | Eberhardt |
| 6,405,102 B1 | 6/2002 | Swartz et al. |
| 6,477,437 B1 | 11/2002 | Hirota |
| 6,516,239 B1 | 2/2003 | Madden et al. |
| 6,654,663 B1 * | 11/2003 | Jokela ........................ 700/230 |
| 6,856,844 B1 * | 2/2005 | McKenzie .................... 700/96 |
| 2002/0107957 A1 | 8/2002 | Zargham et al. |

FOREIGN PATENT DOCUMENTS

| | | |
|---|---|---|
| EP | 0 160 317 B1 | 8/1992 |
| JP | 57211437 A * | 12/1982 |
| JP | 57211438 A * | 12/1982 |
| JP | H04-171145 A | 6/1992 |
| JP | H06-305517 A | 11/1994 |
| JP | 2000-164050 A | 6/2000 |

OTHER PUBLICATIONS

"Computer Integrated Controller for Numerically Controlled Machines and Process Tools," IBM Technical Disclosure Bulletin, Jul. 1994, 3 pgs.

* cited by examiner

METHOD FOR MANUFACTURING AN ITEM

CROSS-REFERENCE TO RELATED APPLICATIONS

This application is a continuation of U.S. application Ser. No. 09/544,422 filed Apr. 6, 2000 now abandoned.

FIELD OF THE INVENTION

The present invention generally relates to a method for manufacturing or assembling an item and more particularly to a method for manufacturing or assembling an item, such as a vehicle, which requires the assembly of a relatively large number of components.

BACKGROUND OF THE INVENTION

Items, such as vehicles, are typically manufactured or assembled by the use of a relatively large number and variety of components such as, by way of example and without limitation, wiring harnesses, sun roofs, and hoods. It should be appreciated that the terms "manufactured" and "assembled", in this Application, mean the creation or construction of an item, such as a vehicle.

Oftentimes, an "assembly line" is used to manufacture or assemble vehicles or other items. In this arrangement, for example, the various components of the vehicle are operatively placed upon the body or frame of the vehicle at various stations or locations of the assembly line. In this manner, each station or location corresponds to a unique stage of the overall vehicle assembly process and requires the placement of a unique component or the performance of a certain function upon the partially formed vehicle. Oftentimes, a single assembly line is used to produce a wide variety of different models or types of vehicles in order to efficiently utilize the manufacturing machinery and personnel included within and/or cooperatively forming the assembly line.

While the manufacture of a wide variety of vehicles by the use of a single assembly line does allow efficient use of existing resources, it does have some drawbacks. For example, many of these dissimilar vehicles respectively require unique types of components. Hence, the number of dissimilar vehicles which may be built or created by an assembly line is typically and directly proportional to the number of different types of components which must be used during the manufacturing process. Therefore, a great variety of components must be used in order to allow a great variety of vehicles to be produced.

Further, since these vehicles are manufactured and "flow through" the assembly line at a relatively fast pace, this relatively large number of components must be readily available to the assembly line personnel. Due to the typical lack of component storage space existing along the assembly line, many of these components must be selectively "shuttled" into the assembly area on an "as needed" basis, thereby further complicating the manufacturing or assembly process. It is desirable to have these components available to the installers before these components are actually needed or utilized in order to allow for a continuous manufacturing process and to maximize the amount of vehicles which are produced.

Particularly, in one non-limiting embodiment, the transport of these components into the assembly area is typically scheduled by the use of a "build schedule" which identifies the order that vehicles are to be manufactured by the assembly line. The build schedule is typically created before assembly actually begins, thereby allowing a planned or scheduled "shuttle" of components in the assembly area to occur.

While this approach does sometimes allow a relatively accurate component transport schedule to be created, oftentimes the "build schedule" must be dynamically altered or changed due to difficulties or occurrences, which arise after the build schedule has been created (e.g. the identity of faulty components which prevent a certain type of vehicle to be built in accordance with the build schedule). Oftentimes the component transport schedule is not modified to reflect these "build schedule changes" or is incorrectly modified, thereby undesirably disrupting the assembly process.

There is therefore a need for a new and improved method for manufacturing and/or assembling an item, such as a vehicle, which overcomes some or all of the previously delineated drawbacks of prior methods.

SUMMARY OF THE INVENTION

It is a first object of the present invention to provide a method for manufacturing an item which overcomes the various and previously delineated drawbacks of prior manufacturing methodologies.

It is a second object of the present invention to provide a method for manufacturing an item which overcomes the various and previously delineated drawbacks of prior manufacturing methodologies, which provides for the manufacture of an item by the use of several components which are cooperatively assembled onto a portion of the item by several individuals, and which further provides certain information to these individuals, effective to ensure that the several components are available for assembly, thereby allowing the item to be manufactured in a timely manner.

According to a first aspect of the present invention a method is provided for manufacturing an item by the use of several components. The method comprises the steps of selecting a first individual; selecting a second individual; creating a first portion of the item; causing the first portion of the item to pass in close proximity to the first individual; assembling a first of the several components on the first portion of the item by the first individual; notifying the second individual of the existence of the first portion of the item and the location of the first portion of the item proximate to the first individual; causing the first portion of the item and the assembled first of the several components to pass in close proximity to the second individual; and assembling a second of the several components onto the first portion of the item by the second individual.

These and other aspects, features, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
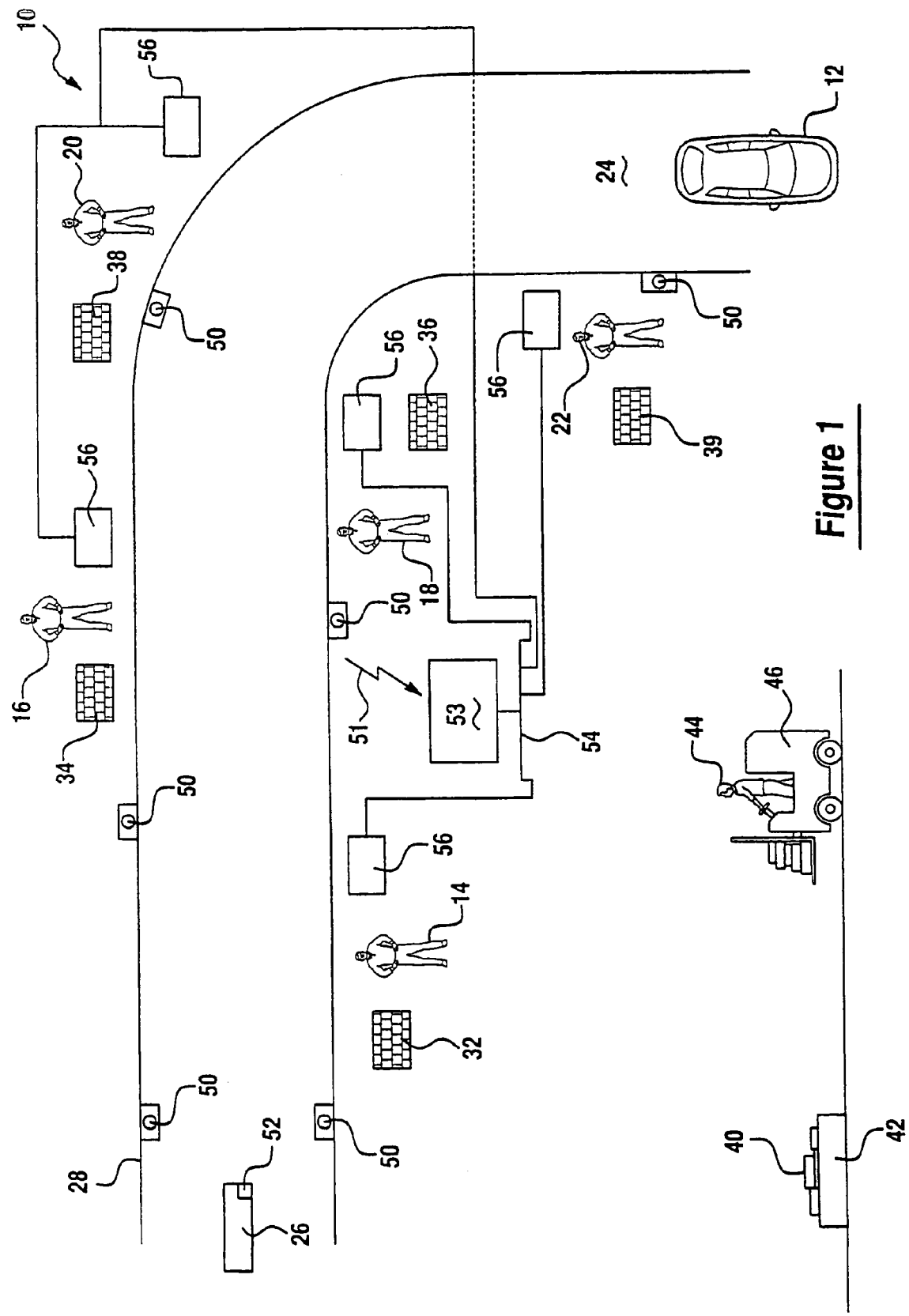
FIG. 1 is a block diagram of an assembly line to which the methodology of the preferred embodiment of the invention may be selectively applied.

Referring now to FIG. 1, there is shown a vehicle manufacturing or assembly line 10 which is adapted to produce a vehicle 12. It should be appreciated that while assembly line 10 is, in this example, adapted to produce a vehicle 12, assembly line 10 could also be adapted to selectively produce other non-vehicular assemblies and/or items and that the methodology of the present invention is not limited to the manufacture and/or assembly of a vehicle.

Particularly, assembly line 10 includes several individuals or "installers" 14, 16, 18, 20, and 22 who are respectively and uniquely positioned in close proximity to a transport assembly or member 24 (e.g., a conveyor belt or assembly line). A first portion 26 of a vehicle 12 (e.g., a previously formed body or frame assembly) is placed at the beginning or "entry point" 28 of the conveyor 24 and is sequentially and subsequently transported in close proximity to individuals 14, 16, 18, 20, and 22 who respectively place unique components onto the first portion 26, thereby cooperatively producing a vehicle 12. Several other substantially identical vehicular first portions 26 may also be sequentially placed upon transport member 24 and used to assemble or create a vehicle, such as vehicle 12, in the foregoing manner. Each of these other first portions 26 may represent respectively unique models or types of vehicles 12 which respectively require unique types of components. These other components may be placed on these other first portions 26 by these individuals 14, 16, 18, 20, and 22. Hence, each individual 14, 16, 18, 20, and 22, during the vehicular assembly process may be respectively required to place many different types of components on the various received first portions 26.

Typically, some components, such as components 32, 34, 36, 38, and 39 may respectively reside in close proximity to assemblers or installers 14–22 while other components, such as components 40, are stored at area or location 42 which is remotely located from conveyor 24 and from assembly line 10. These remotely located components 40 may be selectively transported to the individuals 14–22 by an individual 44 operating a "lift truck" 46. Alternatively, these components may be transported to these individuals 14–22 by use of a handcart or some other manual or selectively driven transport assembly or vehicle.

In one non-limiting embodiment of the invention, each portion of the assembly line 10 which is respectively proximate to a unique one of the individuals 14–22 has a sensor 50 (i.e. a radio frequency receiver). Each sensor 50 senses the identity of the first portion 26 which is currently located proximate to it (e.g., by the use of a radio frequency tag 52 on each first portion 26). The sensor produced "identifying information" also includes the types of components which the identified first portion 26 requires and/or the model of vehicle that this first portion 26 represents since such information may be selectively placed upon the tag 52 which resides upon this first portion 26. A sensor 50 is also placed at entry portion 28 in order to identify the existence of each first portion 26 as it enters the assembly line 10.

In operation, the sensors 50 respectively transmit a signal 51 which is received by a computer 53. As shown, computer 53 is physically and communicatively coupled, by bus 54, to various computer type display devices 56 and these devices 56 are respectively and proximately positioned by a unique one of the individuals 14–22. Signals 51 are effective to cooperatively cause these screens 56 to display the existence and location, within assembly line 10, of each of the identified first portions 26 which are positioned upon conveyor 24. The sensor information therefore allows the displayed location of the items 26 upon devices 56 to be dynamically updated. That is, in one non-limiting embodiment, an icon is uniquely assigned to each first item 26 which is positioned upon conveyor 24 and each uniquely assigned icon is displayed upon each display device 56.

The sensor information allows the location of an item upon the devices 56 to be dynamically updated. That is, in one non-limiting embodiment, each display device 56 includes or has a graphical representative of the assembly line which may, by way of example and without limitation, be substantially similar to the graphical representation which is shown in FIG. 1. The location of an icon upon each of the display devices 56 corresponds to the location, upon conveyor or transport assembly 24 of the member 26 to which that icon is respectively and uniquely assigned. That is, as a member 26 proceeds through the assembly line 10 its corresponding icon "moves along" or changes position upon each of the displays 56 in order to substantially ensure that an icon on a display 56 resides at a position, within the displayed graphical representation of the assembly line 10, which corresponds to its current position within the actual assembly line 10. In an alternate embodiment of the invention, computer 53 may contain and/or include the type of components required by and the model number or type of each such displayed first portion 26.

In this manner, each individual 14–22 is apprised of the identity of each of the first portions 26 which reside upon the transport assembly 24 and which are to be transported to the individuals 14–22. Such information allows the individual to order, by telephone, or by use of radio pagers, individual 44 to bring needed components 40 necessary to assemble the first portions 26. Such components 40 are then selectively transported to the individuals 14–22. Hence, actual assembly data or information is presented to these individual assemblers 14–22 to "warn" or inform them of the need for remotely located components 40 and allows the assembly process to occur without substantial component transportation disruption. Hence, by providing actual or "real time" warning information of the existence of a first portion 26 upon conveyor 24, each individual 14–22 may ensure the availability of needed componentry 40. The use of such "real time" warning data therefore improves upon the use of such previously delineated "build schedules" which were often times changed/modified and were susceptible to the previously delineated difficulties.

It should be understood that the invention is not limited to the exact construction and method which has been previously delineated but that various changes and modifications may be made without departing from the spirit and the scope of the inventions as are more fully delineated in the following claims.

What is claimed:

1. A method for manufacturing an item by the use of a first portion of said item which is transported in close proximity to a plurality of manual installers who respectively place a component upon said first portion of said item, said method comprising the steps of:

providing a radio frequency tag having identifying information that indicates which components are to be installed upon said first portion by said plurality of manual installers;

providing a radio frequency receiver to receive identifying information from said radio frequency tag;

creating a notification from the radio frequency receiver which automatically visually notifies at least one of said plurality of manual installers of said identifying information for said first portion upon a transport member before said first portion is transported in close proximity to said at least one of said plurality of manual installers, thereby allowing said at least one of said plurality of manual installers to retrieve a component corresponding to said identifying information before said first portion is transported in close proximity to said at least one of said plurality of manual installers; and assembling said component corresponding to said identifying information to said first portion by said at least one of said plurality of manual installers.

2. The method of claim 1 wherein said item comprises a vehicle.

3. The method of claim 2 wherein said first portion comprises a body of said vehicle.

4. The method of claim 1 wherein said notification is made by use of a visual display device.

5. The method of claim 4 wherein said first portion is of a certain type and wherein said identifying information further identifies said type and said location of said first portion.

6. The method of claim 1 wherein the identifying information further comprises data representing location and identification of the first portion of said item as the first portion of said item is transported by the transport assembly; and further comprising:

displaying the data representing location and identification of the first portion of said item upon at least one display device that is located proximate to at least one of the plurality of manual installers.

7. The method of claim 6 wherein the displayed data notifies the at least one of the plurality of manual installers to obtain at least one component for manufacturing the item.

8. The method of claim 6 wherein the first portion of said item further comprises a first portion of at least two items.

9. The method of claim 6 wherein at least two dissimilar items are displayed differently.

10. The method of claim 6 wherein the first portion of said item further comprises at least two items and one of the at least two items is manufactured from unique components relative to the other of the at least two items.

11. The method of claim 6 wherein the at least one display device further comprises a plurality of display devices, each located proximate to one of said plurality of manual installers.

12. The method of claim 6 wherein data representing location and identification of at least one of a plurality of items is received from a plurality of locations along the transport assembly.

13. The method of claim 12 further comprising the step of:

updating the display device with changes of location of the item as the item is transported by the transport assembly.

* * * * *